Feb. 14, 1956 W. C. MENZIES 2,734,629
PROCESS AND APPARATUS FOR SEPARATING MIXED MATERIALS
Filed Jan. 29, 1953 4 Sheets-Sheet 2
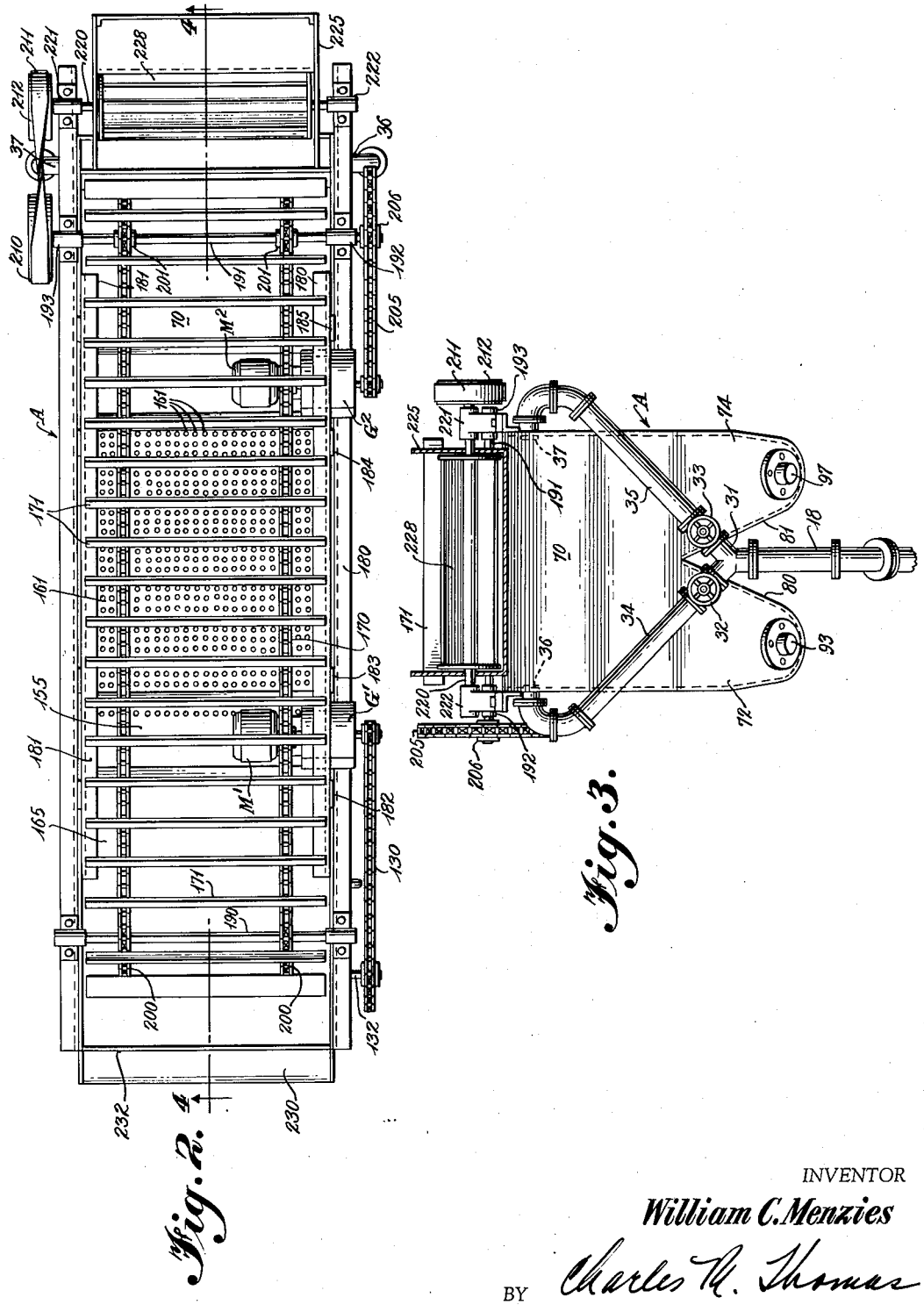
INVENTOR
William C. Menzies
BY Charles M. Thomas
ATTORNEY

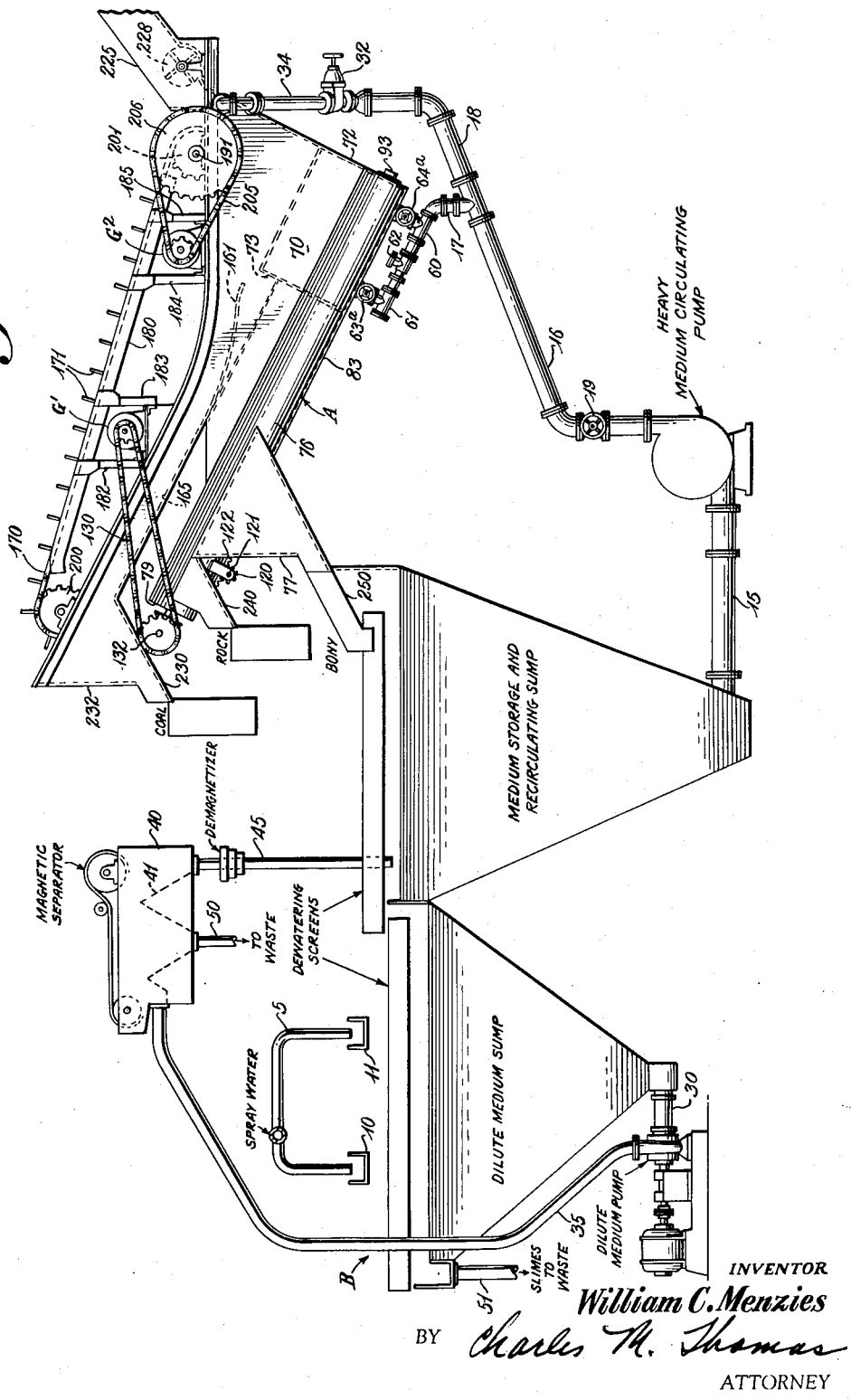

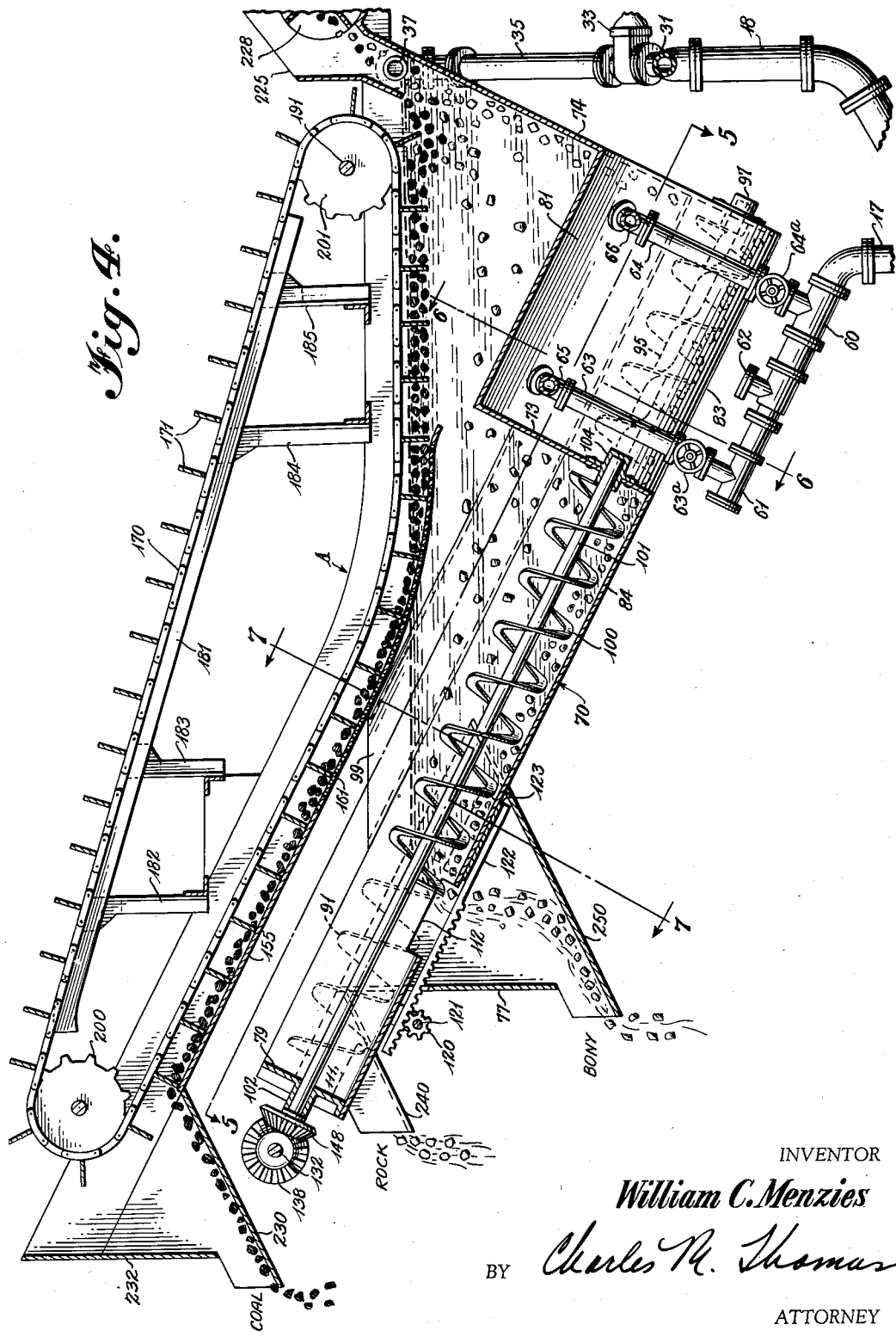

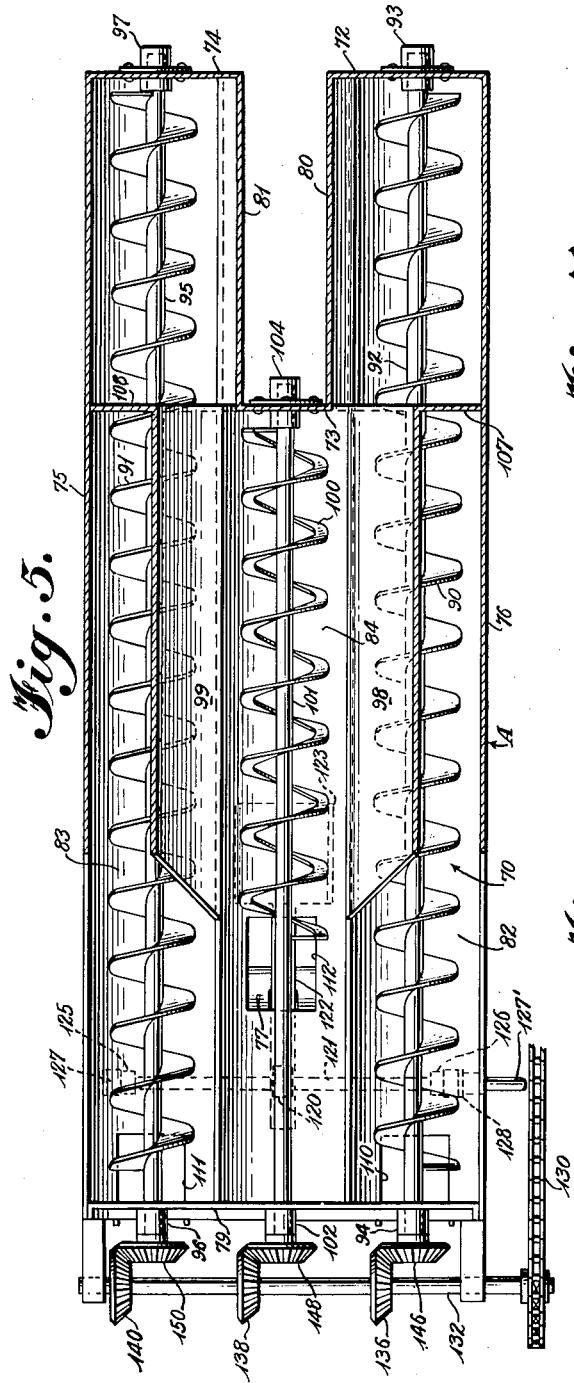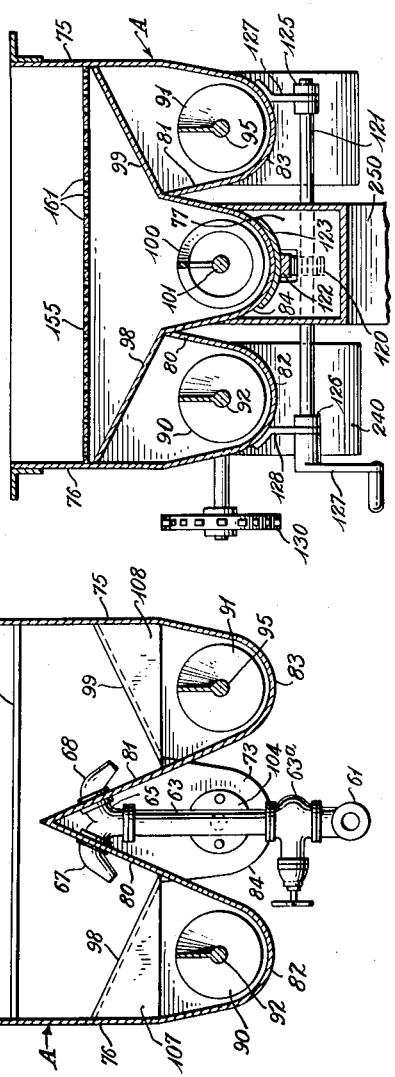

United States Patent Office 2,734,629
Patented Feb. 14, 1956

2,734,629

PROCESS AND APPARATUS FOR SEPARATING MIXED MATERIALS

William C. Menzies, Wyoming, Pa.

Application January 29, 1953, Serial No. 334,027

6 Claims. (Cl. 209—172.5)

This invention relates to a process and apparatus for separating materials having different specific gravities. The invention more particularly relates to an apparatus designed to separate such materials in a one-step simultaneous operation, utilizing either magnetic or non-magnetic heavy mediums of predetermined specific gravity.

The apparatus is also designed for use in the separation of almost any kind of mixed materials but is particularly adaptable to the separation of mixtures of ores having different specific gravities. The invention is most useful in the separation of coal from slate, rock, or other undesirable substances commonly present in raw coal when it is first mined. The invention includes an apparatus for separating solid materials having different specific gravities by means of a stream of dense media solution of such specific gravity that will cause the lightest materials to float, the heavier material to sink, and the intermediate material that remains suspended between top and bottom of the stream of the solution to pass out of the vessel with the solution. The dense media used may consist of finely ground solids in water, either stable or less stable, or any liquid of a specific gravity between coal and rock. The material of value, for example the high grade coal, is of the lowest specific gravity, the rock is of the highest specific gravity and the bone is of the intermediate specific gravity.

It is well understood by those skilled in the art that coal as it is taken directly from the mine commonly contains various amounts of what is called "bone" or "bony" material, and also pieces of rock, pyrites, slate and similar hard, non-combustible substances. The referred-to "bony" is a substance which may be partially coal, but contains also a portion of non-coal such as slate, etc. Such bony material, accordingly, has a specific gravity of less than the referred-to substances such as those mentioned. In order to prepare high quality coal for domestic or commercial use it is thus necessary to separate the same from the deleterious substances which have been mentioned, or those substances of high and intermediate specific gravities.

It is a primary objective of this invention to provide an apparatus that will simultaneously and continuously separate a given mass such as coal into the three portions mentioned: pure coal with impurities removed, so-called "bony" material, and rock or slate extremely high in specific gravity. It is, however, to be appreciated that the apparatus comprising my invention may be altered to perform simultaneous separation of more than the three stated portions and I consider the same to be within the scope and contemplation of this invention. Ordinarily, in commercial and known processes separation of several materials is accomplished by complex and expensive equipment or in separate and distinct stages, each step requiring an additional unit to effectuate the separation. In the instant invention the apparatus employed is of comparative simplicity and far less costly to install and operate. The coal, rock and "bony" are simultaneously and continuously separated in the same separation bath or chamber and additional separating chambers or equivalent apparatus are not required. In fact, the only additional desirable apparatus to perform a complete continuous process is apparatus, heretofore known, used to recover the separating medium employed.

It is a further object of my invention to provide a continuous method and apparatus by which a gravity separation is effected without a disturbing current of media passing out of the vessel with the coal which would draw some of the bone with it; thus, the heavy rock from the moving stream of dense media is dropped into conveyors and the bone permitted to flow with the stream of dense media to the overflow of the vessel. By this method and apparatus the most difficult material to separate, the bone, is not drawn up with the coal or down with the rock but is kept distinctly separate and ready to be broken down to smaller sizes for further treatment.

It is another object of my invention to provide an apparatus which is readily adaptable for use with either non-magnetic heavy mediums or magnetic heavy mediums. In the first-named group are found solid and insoluble constituents such as copper, lead and zinc ores which are ground to a high degree of fineness and incorporated in the aqueous solution to increase its specific gravity to the desired extent. In the other category are the magnetizable materials such as ferro-silicon substances containing a large percentage of magnetizable iron. In using the apparatus of my invention with a non-magnetizable substance it is to be understood that the medium recovery process will include a gravity separation means; whereas when the invention is employed in conjunction with a magnetizable medium such as magnetite the recovery of the material used is accomplished by apparatus involving a magnetizing and de-magnetizing step. As illustrated and disclosed herein, the instant invention is depicted as being used in conjunction with a process for magnetite recovery; however, this is only for purposes of illustration and it is to be appreciated that the non-ferrous materials may be employed for specific gravity control and that gravity separation processes are obviously necessary in that case.

It is another objective of the invention to accomplish a three or more step separation in the manner heretofore indicated with apparatus that is extreme in simplicity, considering the work it performs, and is consequently far cheaper in initial cost and subsequent maintenance than apparatus used in systems wherein each step of the separation is formed by a different and individual unit.

Prefatory to a more detailed description of the invention the apparatus may be briefly characterized as essentially comprising a three-step separation vessel having a triple screw conveyor located therein and provided also with an angularly inclined chain-flight conveyor. The raw coal is fed evenly into the rear end of the vessel at the top level of the heavy medium liquid or solution, the coal floating to the top where it is entrapped by transverse longitudinally propelled conveyor flights and elevated out of the vessel to the clean coal discharge chute. The rock sinks in the solution into two lower sections of limited open exposed portions, which sections are provided with said triple screw conveyor that elevates the rock out of the vessel to the rock chutes. The bone sinks gradually into the moving stream of heavy media solution and is carried forward to the overflow opening. It is entrapped in and propelled by the conveyor flights of the bone section of the triple screw conveyor thus being elevated to the overflow. A large portion of the heavy media solution enters the vessel through two jets that are set slightly above the level of the solution and between the walls of the feed chute. The incoming solution impinges on the feed material to disturb it enough to prevent rafting of the rock and bone by the mass of coal, the solution flowing slowly from the rear of the vessel toward the overflow opening. A small portion of the heavy media solution also enters the vessel through nozzles set on the sloping walls or dividing elements near the bottom of the vessel, the purpose of which is to direct the flow of bone to the overflow of the vessel by a very mild upward current and to prevent the heavier particles of bone from settling in the rock conveyors. The volume of solution discharged from such nozzles will depend on the type of heavy media that is employed, i. e., stable or unstable. The use of the nozzles aids also in maintaining a more even specific gravity of dense media solution from the top to bottom of the vessel. The velocity of flow of dense media solution through the vessel is controlled by both the jets at feed chute and the nozzles near bottom of tank. Proper level of the solution in the vessel is maintained by a sliding gate in the bone conveyor trough. Bone conveyor flights are of the ribbon type to allow free passage of the dense media solution from the vessel.

The invention will now be described more particularly with reference to the following drawings wherein:

Figure 1 is a side elevation view of the apparatus comprising my invention and including also apparatus of known type for removal of the heavy medium, in this instance for purposes of illustration and understanding of the complete process, a medium having fine magnetizable particles therein.

Figure 2 is a plan view of the invention shown in Figure 1.

Figure 3 is an end elevation view, partly in section, of the invention shown in Figure 2, Figure 4 is a section view taken on the line 4—4 of Figure 2.

Figure 5 is a section view taken on the line 5—5 of Figure 4.

Figure 6 is a section view taken on the line 6—6 of Figure 4.

Figure 7 is a section view taken on the line 7—7 of Figure 4.

Referring now to Figure 1 it will be seen that the apparatus comprising my invention is generally indicated at A. It is to be understood that the heavy medium recovery apparatus indicated generally at B in Figure 1 does not comprise a part of my invention. It is here shown, however, in order to make understandable the practical operation of a complete unit inclusive of both the triple separation bath constituting my invention as well as the medium recovery apparatus used in a typical complete set up. As indicated in the foregoing the medium recovery apparatus B is of the magnetic separator type employing independent steps of magnetization of the heavy medium, separation thereof from the liquid medium and de-magnetization of the heavy medium prior to recycling through the separating zone of apparatus A.

Prefatory to a more detailed explanation of the apparatus A comprising my invention, reference is made to the recovery apparatus B. Briefly, and as stated, this apparatus is designed to recover magnetizable particles. These particles are suspended in the separating solution found in apparatus A and after the three separate catagories of materials have been separated it is necessary to recover the heavy suspended material. This is desirable since the medium is costly and must be subject to re-use if the process is to be practical. Accordingly, for relatively complete removal of the medium, the separated materials are each screened by the de-watering screens shown in Figure 1. The first screening operation takes place over the medium storage and re-circulating sump. Here the bulk of the magnetic medium is separated from the lumps of coal, rock and bony material and discharged into the medium storage and recirculating sump. This is followed by a second de-watering screening operation, as indicated to further remove the particles of magnetic material which adhere to the individual separated lumps. In this second screening step such adhered magnetic material is removed by the application of a spray over the second de-watering screen. As indicated, water is admitted through line 5 and injected into spraying devices 10 and 11 which are located immediately above the second de-watering screen. By the use of water the medium recovered is in a much more dilute solution than that removed in the initial stage and drained into the storage and recirculating sump. The medium removed by the second screening and spraying step is discharged into a dilute medium sump.

The dilute medium sump is provided with a line 30 leading into a motor driven dilute medium pump which is interconnected by line 35 with a magnetic separator. Of a common form, the one herein, somewhat diagrammatically shown, consists of a tank 40 having angular partitions 41. The magnetic separator itself is of the belt type, i. e., the belt is magnetized electrically and as the belt is run through the tank 40 it picks up the magnetizable particles of the heavy medium which are in suspension in the solution. These particles are carried to one end of the tank 40 and discharged into line 45. As is well-known, these particles cannot be re-used in the system since, being magnetized, they would accordingly adhere to the walls of the separator tank and related equipment and thus have no effect in increasing the specific gravity of the separating solution. Accordingly, it is necessary to employ a de-magnetizer located in line 45 to neutralize the magnetism of these particles before they are subsequently discharged into the medium storage and recirculating sump.

Two lines carrying waste waters are shown in apparatus B of Figure 1. These are lines 50 which carry off the dilute solution remaining after the heavy medium particles are removed in the tank 40 of the magnetic separator; and also line 51 which carries off the slimes remaining after the two screening operations.

As illustrated in Figure 1, the heavy medium is recycled from the medium storage and recirculating sump to the triple step, simultaneous and continuous separator comprising my invention—apparatus A. This is done by line 15 extending from the bottom of the sump to a heavy medium circulating pump. From the pump line 16 carries it to a T-connection 17 for discharge into the bottom of the separator tank as will be hereinafter described. Line 18, branching off this T-connection, diverges a portion of the heavy medium to the top of the separating tank near the point where the materials to be separated are admitted.

As the structure hereinbefore described is largely conventional and typical of apparatus and processes now in use for the removal of magnetic heavy medium it is felt that no further explanation of the operation thereof is necessary.

Reference will now be made to the method and apparatus comprising my invention, as generally shown in Figure 1 at A.

The separating tank is generally indicated at 70. It has end walls 72, 73, 74 at one end, side walls 75, 76, and opposing end plate 77. End plate 77 forms a front part of the bony chute and extends from one side to the opposite side of the boney conveyor. Bottom walls 82 and 83 are curved to house the outbound screw conveyors, as will be hereinafter described. A central curved housing 84, commencing at end wall 73, provides enclosure for the central conveyor screw. End wall 79 closes each of the three conveyor housings 82, 83 and 84.

Heavy medium fluid is admitted to the tank by several separate outlets interconnected either to line 17 or to line 18. Thus, referring to the former, the heavy medium passes through two T-connections 60 and 61 between which may be located, if desired, a connection 62 for a regulating valve. These T-connections are centrally located underneath the tank and each lead to separate lines 63 and 64. These terminate into two Y-connections which end in downwardly extending nozzles such as shown at 67 and 68

(Figure 6). Control valves 63a and 64a are interposed in each of these lines 63 and 64. Referring to the other connections to the heavy medium inlet line 18 it is seen that this line terminates in a Y-connection 31, each leg of the Y being provided with usual control valves 32 and 33 and the later respectively leading to two extensions 34 and 35. Such extensions, each directed around the end of the tank, terminate in two outlets 36 and 37 which are located near the end of the tank and also near the top thereof closely adjacent to the point where the material to be separated is admitted.

The lowermost end of the tank is fitted with a dividing element for deflecting the material of heaviest specific gravity to each side of the separator vessel. Such divider is comprised of two sloping walls or plates 80 and 81 extended angularly towards each other so as to meet at the center of the tank as shown in Figure 6. As will be understood by reference to this figure the two nozzles 67 and 68 are positioned through each of these side plates 80 and 81, each nozzle being fitted with suitable gaskets on each side of the plates to render them watertight. As the material heaviest in specific gravity (such as slate, rock and pyrites in the treatment of coal) is admited to the tank this dividing structure forces the same to each side of the divider where such heavy material is picked up by two conveyors 90 and 91, both of the screw type. The sloped dividing plates 80 and 81 can be made integral with the two outboard conveyor housings as shown in Figure 6.

Each of the screw conveyors 90 and 91 are mounted upon shafts 92 and 95 respectively. Shaft 92 is rotatably secured in to appropriate bearings 93 and 94, the first located in rear wall 74 and the second in wall 79. Similarly positioned are two bearings 96 and 97 for support of the screw conveyor shaft 95 on the other side of the tank. These bearing are respectively positioned in end walls 72 and 79.

A third screw conveyor 100 offers propulsion for the intermediate or so-called "bony" material which is floated off from the separating medium at a point intermediate the surface of such medium and the bottom of the tank. This circular conveyor 100 is rotated on a shaft 101 supported at each end by appropriate bearings 102 and 104. Bearing 102 is mounted through end wall 79 and bearing 104 through end wall 73, which extends substantially inwardly of the end walls 72 and 74.

Still referring to the construction of the bony conveyor section and conveyor 100 it will be observed that on each side thereof and disposed approximately at right angles to the sloping walls 80 and 81 are two additional direction plates 98 and 99. Each of these plates extend from the side walls 75 and 76 respectively to walls 80 and 81 respectively. They are closed off at their lower ends by right angular partitions 107 and 108 which also extend transversely to the side walls 75 and 76. Such plates 98 and 99 provide guideways or what might be termed a trough for the flow of the materials in suspension or those materials which are of a specific gravity approximately equivalent to that of the heavy medium, and aid in directing the flow thereof toward the central bone conveyor 100. These plates 98 and 99 also provide a covering over each of the outboard or rock conveyors 90 and 91, such covering over each of these conveyors extending from the end of the bony or central conveyor to the top of the vessel. There is thus formed a limited opening into the rock conveyors, namely the opening between walls 75 and 81 on the one hand, and opening between walls 76 and 80 on the other. Both openings also extend up to the partitions 107 and 108, respectively.

Also with respect to the third or central screw conveyor 100 it is to be noted that it is of the open, or ribbon type to permit the free passage of dense media fluid therethrough during conveyance of the bone or material of intermediate specific gravity to its discharge point.

Near the uppermost or delivery end of each of these three conveyors is provided an opening for discharge of the separated material. Thus the two side or outboard conveyors 90 and 91 propel the material of heaviest specific gravity upwardly to discharge openings 110 and 111 respectively. The spiral conveyor 100 is considerably shorter and approximately two-thirds of the length of the side conveyors, as seen in Figure 5. Adjacent the point where it terminates is located a third discharge opening 112 for emission of the bony. Actually, opening 112 may be considered an overflow for bony and heavy medium.

In order that the height of the separating medium can be regulated a sliding gate is provided under opening 112 to adjust the vertical distance of such opening from the bottom of the separating tank, and thus adjust the level of the solution in the separating vessel to its desired height. This gate structure includes a gear-ratchet mechanism. Gear 120 is adapted to engage a longitudinally reciprocable ratchet 122. One end of the ratchet, the lowermost end, has positioned thereon a gate 123 appreciably larger than the size of opening 112, and contoured to fit the convex shape of casing 84 which houses the central conveyor. Such gate is maintained in slidable relationship with the casing by any common and well-known expedient, and fits sufficiently snugly to be relatively liquid proof at its juncture with casing 84. Gear 120 for reciprocating the ratchet, and hence the gate, is secured to a drive shaft 121 suitably mounted in opposed bearings 125 and 126 which are in turn supported on brackets 127 and 128 welded or otherwise affixed to the underside of the outboard conveyor casings 82 and 83. (See Figure 7) Although means for the propulsion of the ratchet may be automatic or motor driven it is here shown as manually driven by a suitable hand crank 127.

All three of these screw conveyors are powered by a single motor driven source. Referring to Figure 2, a motor M–1 is secured in any suitable fashion to the framework supporting the separating tank. As here shown, the motor is mounted between stanchions 182 and 183. It delivers torque to a gear reduction transmission G–1 which, through a chain drive 130 and appropriate sprocket wheel transmits power to a transverse drive shaft 132. The latter is provided with three bevel gears 136, 138, and 140 suitably spaced to mesh with three complementary bevel gears 146, 148 and 150 respectively. The first of these is splined to the end of conveyor shaft 92, the second to conveyor shaft 101 and the third to conveyor shaft 95. Thus, all three shafts and all three spiral conveyors are driven in the same direction and at the same speed to propel two of the separated materials, namely, stone, slate or other heavy components on the one hand, and intermediate or "bony" material on the other from the lowermost portions of the separating tank to their respective points of discharge.

The floatable material, which in the case of coal separation is the coal itself, is removed by the use of a chain and flight conveyor. To this end a plate 155, parallel over the greater part of its length with the angularly positioned rotary conveyors, is positioned between the two side elements 75 and 76 of the tank. Referring to Figure 4 it is seen that this plate extends from a point approximately above the end of the two outboard spiral conveyors to a point at the opposite and lower end just above the beginning of the central circular spiral conveyor. Approximately one-half of this plate 155 is perforated as at 161, this being the lower half thereof. The lower half also is slightly curved downwardly at the lower end so that such end is positioned approximately parallel with the surface of the separating medium and slightly thereunder and thus suitably located for reception of the floatable materials. A suitable linked conveyor chain 170 having a series of flights 171 is driven (viewing Figure 4) in a clockwise direction so that, as readily seen by this figure, the floating coal is picked up by the flights of the conveyor belt and carried over the plate 155 to a discharge point well above the surface of the separating medium and rearwardly of the discharge points for the rock and "bony" material. The purpose of the perforations 161 in this plate is that of a screening operation—as the separated coal is removed from the heavy medium and propelled along the perforated section of this plate the greater portion of the medium will be drained from the coal particles. As set forth in the foregoing, the medium adhering to the separated particles is subsequently removed by further screening and dilution followed by either a magnetizing arrangement if a ferrous material is utilized, or by gravity separation if a non-magnetizable heavy medium is employed.

The flights 171, referred to in the foregoing, extend transversely of the triple conveyor sections. The linked belt 170 as well as such flights are supported slidably on pans 180 and 181 angularly inclined with respect to the heavy medium bath. These conveyor pans are simply angle iron bars as indicated in Figures 2 and 4, the terminal ends of each of the flights sliding upon the same when the flight conveyor is in motion. The pans or angle iron supports are in turn maintained in position by affixing them to vertical beams or stanchions 182, 183, 184 and 185 (Figure 4) on each side of the conveyor. On each side the links supporting the flights engage suitable sprocket wheels such as those shown at 200 and 201, the sprocket wheels being driven in the following manner: a motor M-2 is mounted between stanchions 184 and 185 and geared to a suitable gear reduction transmission G-2. This transmission provides power to drive chain 205 and in turn a drive sprocket wheel 206 which is keyed to a transverse shaft 191, the latter being supported in bearings 192, 193. The opposing sprocket wheels 200 and 201 are mounted upon this shaft 191 so that upon actuation of the motor M-2 the entire conveyor system is placed in motion to cause the underneath flights of the conveyor to travel upwardly the length of the heavy medium density bath, and return downwardly in an opposite direction over the conveyor pans 180 and 181.

It will be seen that a feeding mechanism is also provided for feeding or discharging material to be separated into the deep end of the separating chamber. To this end the aforesaid shaft 191 is with a drive wheel 210 here shown as being of a type to drive a flat drive belt 211 which in turn rotates a complementary pulley wheel 212. The latter is keyed to a shaft 220 which is mounted in suitable bearings 221, 222, and drives a propeller 228 here disclosed as a four-bladed paddle. The blades of the paddle, as is shown in Figures 1 and 2, extend transversely to the triple conveyor sections of the bath and are almost as wide as the aforementioned flights of the conveyor mechanism. This paddle or propeller 228 is located in a depression of complementary contour in the bottom of a chute 225, adapted to charge materials to be separated to the separator vessel. The motion of the paddle will thus facilitate and propel the lumped and unsorted material in definite and regulated amounts into the separating bath.

As stated, there are three separate chutes or outlets for discharge of the separated materials. Thus referring to Figure 4, the floatable material, in this instance coal, is carried by the conveyor flights 171 along plate 155 to a chute 230 and thence discharged if desired into apparatus suitable for removing the heavy medium still adhered to the coal. This chute has superimposed above it an end plate 232 which goes across the entire end of the separating bath and terminates at an appreciable distance above member 230 to permit passage of the coal thereunder.

Similarly, the heavy segregated materials which, in the purification of raw coal, largely comprise rock and slate, are propelled by the two outboard conveyors 90 and 91 to points of discharge at the upper ends of such conveyors. Thus openings 110 and 111 in the bottom of the troughs or housings within which these conveyors are mounted are provided to receive such heavy separated materials. Referring to Figure 4 a chute or chutes 240 are necessary to convey the rock to the de-watering screens in a manner heretofore described.

The arrangement with respect to discharge of "bony" material or that material of a specific gravity closely approximating the specific gravity of the medium used is largely the same. The opening 112 is positioned at the upper end of the housing within which is mounted the screw conveyor 100. It is located approximately where such conveyor terminates. As hereinbefore mentioned the height of this opening with respect to the bottom of the separating bath may be varied by a cam ratchet arrangement permitting the plate 123 to partially close the said opening 112. In any event, positioned immediately underneath such opening 112 an additional chute 250 is provided and affixed in any suitable manner to the framework of the separating bath structure. Depending end plate 77, positioned transversely of the bath, partially incloses the chute and extends from one side to the opposite side of conveyor housing 84. Such plate 77 terminates appreciably short of the bottom of chute 250 to permit discharge of the "bony" material therefrom onto the de-watering screen of the type mentioned heretofore.

From the foregoing description of my invention the operation thereof should be readily understood. Whether a magnetic material such as magnetite is used as the heavy medium or simply finely ground materials which are not magnetizable, they are placed in suspension in an aqueous solution in an amount sufficient to raise the specific gravity of such solution to a point intermediate the specific gravities of coal and rock. In many cases this would be approximately 1.70. Pure usable coal, being of an appreciably lesser specific gravity, will float in this medium. "Bony" material being part coal and, for example part pyrite, often approximates this specific gravity and accordingly even large lumps of the same will tend to remain suspended in the middle of the bath. Rock and slate, of considerably greater specific gravity, tend to rapidly sink. This theory of operation is manifestly applicable to the separation of other ores or materials. The primary condition to be regulated is the specific gravity of the bath. This, in any given operation, is made intermediate the materials to be separated. Accordingly, the foregoing is by way of example only.

Taking the purification of coal as an example, the bath is filled to the level indicated in Figure 4 with a heavy medium solution having a specific gravity of approximately 1.70. Impure coal is discharged through chute 225 and propelled into the bath by the paddle 228 in desired amounts. As depicted in Figure 4 the rock and other heavy portions of the composite materail immediately sink to the bottom of the bath. Such are deflected by the separator plates 80 and 81 to the outboard screw conveyors 90 and 91. The conveyors then pick up these materials and deliver them to the respective discharge openings 110 and 111.

Conversely, the pure coal having the lightest specific gravity and that which is less than the specific gravity of the bath floats without undue difficulty. The conveyor flights 171 propel this floatable material towards the opposite ends of the bath over perforated plate 155 and up to a point of discharge represented by the chute 230.

In the meantime as both of these operations progress the intermediate constituents of the mixture of materials—the so-called "bony" being part coal and part slate or rock and closely approximating the specific gravity of the bath tend to remain in suspension in the center of the fluid medium as indicated in Figure 4. The heavy medium is recycled or initially admitted into the lower portion of the bath through nozzles 65 and 66. Such admission of additional fluid creates a turbulence which promotes and maintains the suspension of these intermediate "bony" components in the heavy medium. In the meantime, induced also by the action of circular screw conveyor 100, the solution is caused to flow towards said conveyor, materially aided by direction plates 98, 99. Carrying with it these suspended lumps of intermediate specific gravity, the heavy medium is then propelled by conveyor 100 to point of discharge. At all times during the conveyance of such materials they may remain in the heavy medium bath and consequently a portion of such medium is discharged along with the so-called "bony." The amount of discharge of this fluid can be controlled within limits by setting the plate 123 at a point that will block the flow of all the medium except that absolutely necessary to carry the "bony" to the point of discharge. From this point such "bony" constituent travels through chute 250 to the de-watering screens of the medium recovery apparatus B.

This apparatus and process of triple and simultaneous separation to purify mixed materials of different weights is thus continuous and when used in conjunction with known methods and apparatus for medium recovery contemplates recycling of the medium so that the process need not be interrupted during performance thereof.

It will be seen from the foregoing that I have provided an apparatus that is most simple in construction, compact, and extremely efficient in operation. Processes known to the art are expensive, complex and cumbersome and exhibit less operative efficiency. By the practice of my invention not only are several different steps combined into one but the cost of installation and maintenance of more expensive equipment are eliminated as well as the excessive time requirements to perform successful separation of the type herein contemplated.

Although it is obvious that this invention may be varied in many ways and other expedients or alternates employed to accomplish the purposes hereof, it is to be understood that my invention is only limited by the scope of the following claims.

What is claimed is:

1. An apparatus for the separation of solid materials having different specific gravities comprising a separating vessel, said vessel having an inclined bottom and having three screw conveyors located therein, each of said screw conveyors being positioned at the inclination of said bottom, two of said conveyors extending from the lowermost portion of said vessel to a point above said vessel, a third central conveyor extending from a point above the lowermost portion of the vessel to a point near the top thereof, a flight conveyor having a portion thereof positioned in a plane substantially parallel to said screw conveyors, said flight conveyor being above said screw conveyors and extending from an upper level in said vessel to a point above said screw conveyors, means to direct heavy materials to said two conveyors comprising an inverted V-shaped baffle therebetween, and means for directing fluid flow toward said central conveyor comprising plates over said two conveyors inclined downwardly toward said central conveyor, medium-admission nozzles in the bottom of said vessel, and means for the admission of said materials, said last-named means being located above the lowermost portion of said vessel.

2. An apparatus for separating solid materials of light, intermediate and heavy specific gravities comprising a vessel angularly inclined with respect to the horizontal and adapted to hold a separating medium at a predetermined level, at least two outboard conveyor housings and one central conveyor housing in said vessel, spiral conveyors in said housings, said outboard conveyors extending from the lowermost portion of said vessel to a point near the top of said vessel, said central conveyor extending from a point intermediate the top and bottom of said vessel to a point near the top of said vessel and near said level, baffle means between said outboard conveyors at said lowermost portion to deflect heavy materials thereto, baffle means covering said outboard conveyors extending downwardly toward said central conveyor to direct said medium thereto, means located near the top of said vessel and above said lowermost portion to admit said materials, and a plurality of means for admitting said medium, some of said medium admission means being adjacent said material admission means, and other of said medium admission means being adjacent the bottom end of said central conveyor.

3. An apparatus for separating solid materials of different specific gravities comprising a vessel angularly inclined with respect to the horizontal and adapted to hold a separating medium at a predetermined level, at least two outboard conveyor housings and one central conveyor housing in the bottom of said vessel, spiral conveyors in said housings, said outboard conveyors extending from the bottom of said vessel to above the top thereof, said central conveyor extending from the lower half of said vessel to a point below said level, discharge outlets in the upper ends of said outboard housings, a discharge opening within said vessel at the upper end of said central conveyor, plate members forming an inverted V between said outboard conveyors at the lower portion thereof to direct heavy materials thereto, fluid guideways on each side of said central conveyor for directing fluid flow thereto, said guideways forming covers for said outer conveyors over the portion of their extent along which said central conveyor lies, a flight conveyor above said central and outboard housings, said flight conveyor extending from the surface of medium in said vessel to above said discharge outlets, and means to admit materials to said vessel.

4. An apparatus for separating materials of different specific gravities comprising a vessel for heavy liquid medium, said vessel having an inclined bottom, means to admit said materials and said medium to said vessel, at least two outboard and one central conveyor means, said outboard conveyor means extending from the bottom of said vessel to a point above the top thereof, a first baffle means between said outboard conveyors at the lower portions thereof to direct heavy material to each of said outboard conveyors, said central conveyor extending from said baffle means to a point near the top of said vessel, a second baffle means extending from said first baffle means along each side of said central conveyor to direct materials of intermediate specific gravity thereto, said second baffle means covering said outboard conveyors over the portion of their extent along which the central conveyor lies, discharge outlets adjacent to each of said conveyors, and a flight conveyor means extending from the surface of said medium to a point above said discharge outlets whereby materials of light specific gravity are discharged.

5. An apparatus for separating materials of different specific gravities comprising a vessel for heavy liquid medium, means to admit said materials and said medium to said vessel, said vessel having an inclined bottom, at least two outboard and one central conveyor means, said outboard conveyor means extending from the bottom of said vessel to a point above the top thereof, a first baffle means between said outboard conveyor means at the lower portion thereof to direct heavy material to each of said outboard conveyors, said central conveyor extending from said baffle means to a point near the top thereof, said central conveyor being of the ribbon spiral type to permit passage of suspended materials of intermediate specific gravity therethrough, a second baffle means extending from said first baffle means along each side of said conveyor to direct materials of intermediate specific gravity thereto, said second baffle means covering said outboard conveyors from said first baffle means to a point adjacent the end of said central conveyor, discharge outlets adjacent to each of said conveyors, and a flight conveyor means extending from the surface of said medium to a point above said discharge outlets whereby materials of light specific gravity are discharged.

6. An apparatus for separating materials of heavy, intermediate and light specific gravities comprising a vessel for heavy liquid medium, said vessel having an inclined bottom, means to admit said materials, at least two outboard conveyors and one central spiral conveyor, said outboard conveyor extending from the bottom of said vessel to a point above the top thereof, a first baffle means between said outboard conveyors at the lower portions thereof to direct heavy material to each of said outboard conveyors, said baffle means comprising a pair of plates forming an inverted V structure, said central conveyor extending from said baffle means to a point near the top thereof, a second baffle means extending from said first baffle means along each side of said conveyor to direct materials of intermediate specific gravity thereto, said second baffle means covering said outboard conveyors over the portion of their extent along which the central conveyor lies, discharge outlets adjacent to each of said conveyors, means to create turbulence in said medium and to propel said materials of intermediate specific gravities toward said central conveyor, and a flight conveyor means extending from near the surface of said medium to a point above said discharge outlets whereby materials of light specific gravity are discharged, and medium agitation means including a medium inlet positioned in said plates and a medium inlet spaced above the lower ends of said outboard conveyors.

References Cited in the file of this patent

UNITED STATES PATENTS

| | | |
|---|---|---|
| 1,392,400 | Chance | Oct. 4, 1921 |
| 1,523,739 | Vodicka | Jan. 20, 1925 |
| 2,025,841 | Young | Dec. 31, 1935 |
| 2,139,047 | Tromp | Dec. 6, 1938 |
| 2,319,457 | Hirst | May 18, 1943 |
| 2,559,403 | Cover | July 3, 1951 |

FOREIGN PATENTS

| | | |
|---|---|---|
| 530,742 | Great Britain | Dec. 19, 1940 |
| 673,631 | Great Britain | June 11, 1952 |